(12) United States Patent
Ho

(10) Patent No.: US 7,542,259 B2
(45) Date of Patent: Jun. 2, 2009

(54) PROTECTION APPARATUS AND METHOD FOR PROTECTING ELECTRONIC SYSTEM USING THE SAME

(75) Inventor: Sheng-Feng Ho, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 162 days.

(21) Appl. No.: 11/622,473

(22) Filed: Jan. 12, 2007

(65) Prior Publication Data

US 2008/0080119 A1  Apr. 3, 2008

(30) Foreign Application Priority Data

Sep. 28, 2006  (TW) .............................. 95135924 A

(51) Int. Cl.
*H02H 5/04* (2006.01)
(52) U.S. Cl. ..................................... 361/93.8; 361/103
(58) Field of Classification Search .................. 361/103, 361/104, 106, 93.8
See application file for complete search history.

(56) References Cited

U.S. PATENT DOCUMENTS

| 5,737,170 | A | 4/1998 | Moyer |
| 6,437,614 | B1 * | 8/2002 | Chen .......................... 327/143 |
| 6,552,945 | B2 * | 4/2003 | Cooper et al. ............... 365/212 |
| 6,717,457 | B2 * | 4/2004 | Nanba et al. ................ 327/513 |
| 6,789,939 | B2 * | 9/2004 | Schrodinger et al. ........ 374/178 |

\* cited by examiner

*Primary Examiner*—Danny Nguyen
(74) *Attorney, Agent, or Firm*—Jianq Chyun IP Office

(57) ABSTRACT

A protection apparatus adapted for providing thermal protection to an electronic system includes a thermal detection module and a comparator unit. The thermal detection module is configured for outputting a first voltage signal with positive temperature coefficient characteristic and a second voltage signal with negative temperature coefficient characteristic. The comparator unit is configured for comparing the first voltage signal with the second voltage signal to generate a comparing value to determining whether or not to allow the electronic system to operate normally.

7 Claims, 4 Drawing Sheets

US 7,542,259 B2

PROTECTION APPARATUS AND METHOD FOR PROTECTING ELECTRONIC SYSTEM USING THE SAME

CROSS-REFERENCE TO RELATED APPLICATION

This application claims the priority benefit of Taiwan application serial no. 95135924, filed on Sep. 28, 2006. All disclosure of the Taiwan application is incorporated herein by reference.

BACKGROUND OF THE INVENTION

1. Field of the Invention

The present invention generally relates to a protection apparatus and a method for fabricating the same, and more particularly, to a thermal protection apparatus and a method for protecting an electronic system using the same.

2. Description of Related Art

FIG. 1 illustrates a conventional thermal shutdown circuit, which is disclosed in U.S. Pat. No. 5,737,170. Referring to FIG. 1, in the conventional thermal shutdown circuit 100, resistors 103 and 104 cooperatively form a voltage divider circuit, for dividing a bias voltage $V_{BG}$ and then outputting the divided voltage to the base of a BJT transistor 105.

Because the turn-on voltage of the BJT transistor has a negative temperature coefficient characteristics, the turn-on voltage ($V_{BE}$) drops approximately 2 mV for every 1° C. rise in the ambient temperature. Once the ambient temperature rises to a critical temperature, the BJT transistor 105 will be turn on to shutdown the electronic system 120, thereby providing thermal protection to the electronic system 120.

The above action is operated under the precondition of a presumed zero temperature coefficient of the bias voltage $V_{BG}$. In practice, however, the bias voltage $V_{BG}$ may have positive or negative temperature coefficient characteristics. Therefore, the bias voltage $V_{BG}$ may be subject to a voltage drift as ambient temperature changes, which may cause problems in operation. For example, although the ambient temperature does not reach the critical temperature, the drift of the bias voltage $V_{BG}$ may cause an early turn on of the BJT transistor 105; on the other hand, although the ambient temperature rises beyond the critical temperature, the BJT transistor 105 is not turn on, both conditions can cause damage to the electronic system 120.

In addition, not only the drift of the bias voltage VBG, but also the process of fabricating the BJT transistor 105 can cause the turn-on voltage to be nonlinear with the ambient temperature. That is, as the ambient temperature rises, the turn-on voltage of the BJT transistor 105 may drop less than 2 mV or more than 2 mV for every 1° C. rise in the ambient temperature. Accordingly, the conventional thermal shutdown circuit can not provide an effective thermal protection to the electronic system 120.

Therefore, how to provide a reliable protection apparatus is an important subject of research.

SUMMARY OF THE INVENTION

Accordingly, the present invention is directed to a protection apparatus for providing effective thermal protection to an electronic system, and a method for protecting an electronic system using the same.

The present invention is also directed to a protection apparatus including noise reduction function, and a method for protecting an electronic system using the same.

According to an embodiment of the present invention, a protection apparatus is provided. The protection apparatus includes a first temperature detection element, a second temperature detection element, and a comparator unit. The first temperature detection element is configured for receiving a first current signal and generating a first voltage signal according to the first current signal. The second temperature detection element is configured for receiving a second current signal and generating a second voltage signal according to the second current signal. The comparator unit is configured for comparing the first voltage signal with the second voltage signal to generate a protection signal.

In the embodiment of the present invention, the first temperature detection element is an element with positive temperature coefficient such as, for example, a positive temperature coefficient resistor. The second temperature detection element is an element with negative temperature coefficient such as, for example, a negative temperature coefficient resistor.

According to an embodiment of the present invention, the current value of the first current signal is substantially same as that of the second current signal.

According to another aspect of the present invention, a protection apparatus for providing thermal protection to an electronic system is provided. The protection apparatus includes a temperature detection module and a comparator unit. The temperature detection module is configured for outputting a first voltage signal and a second voltage signal, wherein the values of the first and second voltage signals vary with variation in the ambient temperature. The comparator unit is configured for comparing the first voltage signal with the second voltage signal, and generating and transmitting a protection signal sent to the electronic system for determining whether or not to allow the electronic system to operate normally.

In the embodiment of the present invention, the value of the first voltage signal increases with the increase in the ambient temperature, and the value of the second voltage signal decreases with the increase in the ambient temperature.

In addition, the temperature detection module includes a current mirror circuit, a positive temperature coefficient resistor, and a negative temperature coefficient resistor. The current mirror circuit may output two identical currents to the positive temperature coefficient resistor and the negative temperature coefficient resistor, respectively, for generating the first voltage signal and the second voltage signal.

Furthermore, the comparator unit generates a comparing value by subtracting the second voltage signal from the first voltage signal. When the comparing value is greater than a first predetermined voltage, the comparator unit enables the function of a cutoff signal so as to cease the operation of the electronic system. On the other hand, when the comparing value is smaller than a second predetermined voltage, the comparator unit disables the function of the cutoff signal so as to maintain normal operation of the electronic system. The first predetermined voltage is greater than the second predetermined voltage.

According to another aspect of the present invention, a thermal shutdown method for protecting the electronic system is provided. The thermal shutdown method includes generating a first voltage signal; generating a second voltage signal; comparing the first voltage signal with the second voltage signal and generating a protection signal according to the comparison result; and determining whether or not to allow the electronic system to operate normally according to the protection signal. The value of the first voltage signal is directly proportional to the ambient temperature, and the value of the second voltage signal is inversely proportional to the ambient temperature.

According to another aspect of the present invention, a chip is provided. The chip includes a protection apparatus and a control unit. In one embodiment, the protection apparatus includes a positive temperature coefficient resistor, a negative temperature coefficient resistor, and a comparator unit, wherein the positive temperature coefficient resistor is configured for receiving a first current signal to generate a first voltage signal, the negative temperature coefficient resistor is configured for receiving a second current signal to generate a second voltage signal, and the comparator unit is configured for comparing the first voltage signal with the second voltage signal to generate a protection signal. Thus, the control apparatus may determine whether or not to cease chip operation according to the protection signal.

According to an aspect of the present invention, first, one voltage signal having a positive temperature characteristic is compared with another voltage signal having a negative temperature characteristic, and then whether or not to allow the electronic system to operate normally is determined according to the comparison result. Thus, the protection apparatus of the present invention is capable of providing an effective thermal protection to the electronic system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
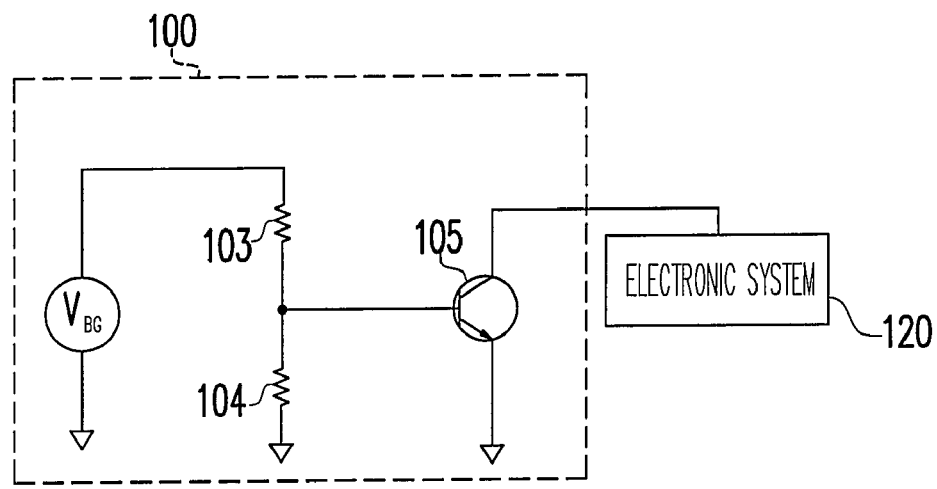
FIG. 1 is a circuit diagram of a conventional protection apparatus.

Reference will now be made in detail to the present preferred embodiments of the invention, examples of which are illustrated in the accompanying drawings. Wherever possible, the same reference numbers are used in the drawings and the description to refer to the same or like parts.

Figure 2:
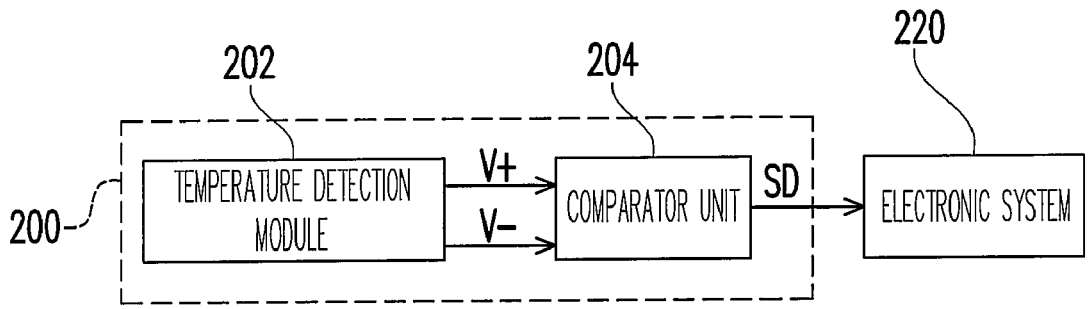
FIG. 2 is a block diagram of a protection apparatus in accordance with a preferred embodiment of the present invention.

FIG. 2 illustrates a protection apparatus for providing thermal protection to an electronic system in accordance with a preferred embodiment of the present invention. In this embodiment, the protection apparatus 200 comprises a temperature detection module 202 and a comparator unit 204. The output of the temperature detection module 202 is sent to the comparator unit 204, and the comparator unit 204 generates a protection signal SD according to the output of the temperature detection module 202 to determine whether or not to allow the electronic system 220 to operate normally.

The temperature detection module 202 is configured to generate a first voltage signal V+ and a second voltage signal V−, wherein the first and second voltage signals having positive and negative temperature coefficient characteristics, respectively. When the temperature detection module 202 outputs the first and second voltage signals V+ and V− to the comparator unit 204, the comparator unit 204 compares the first voltage signal with the second voltage signal and generates the protection signal SD according to the comparison result to control the electronic system 220.

Figure 3:
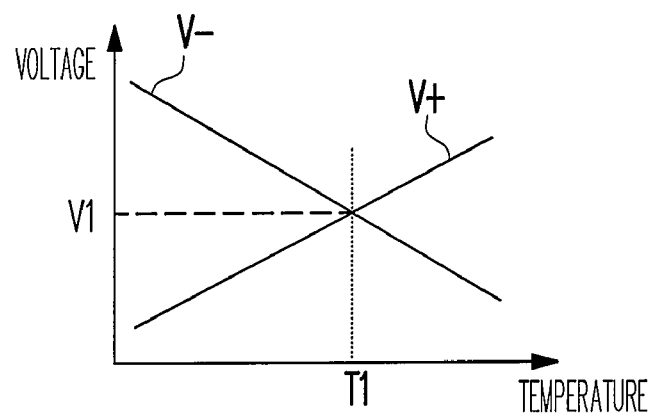
FIG. 3 is a view showing the variation of the first and second voltage signals of FIG. 2 with ambient temperature change.

FIG. 3 illustrates the variation of the first and second voltage signals of FIG. 2 with the change in the ambient temperature. Referring to FIGS. 2 and 3, in this embodiment, after comparing the voltage signals V+ and V−, the comparator unit 204 generates a cutoff signal SD to determine whether or not to maintain normal operation of the electronic system 220 or cease operation of the electronic system 220.

It can be clearly seen in FIG. 3, because of the positive temperature coefficient characteristic of the first voltage signal V+, the value of the first voltage signal V+ increases with the increasing value of the ambient temperature. On the other hand, because of the negative temperature coefficient characteristic of the second voltage signal V−, the value of the second voltage signal V− decreases with the increasing value of the ambient temperature. In this embodiment, when the ambient temperature is at the critical point T1, the first and second voltage signal V+ and V− have a same voltage value. When the ambient temperature rises beyond the critical temperature T1, the first voltage signal V+ is greater than the second voltage signal V−. Accordingly, after the comparator unit 204 compares the first voltage signal V+ with the second voltage signal V− (for example, the first voltage signal V+ subtracts the second voltage signal v−), a positive comparing value is obtained. The resulting positive comparing value is used as a protection signal SD for ceasing the operation of the electronic system 220.

On the other hand, when the environment temperature is smaller than the critical temperature T1, after the comparator unit 204 compares the first voltage signal V+with the second voltage signal V−, a negative comparing value is obtained, and the electronic system 220 maintains normal operation. It should be noted that, although the protection signal SD is a positive comparing value in this embodiment, it is not limited to this. In another embodiments, the protection signal SD may also be a negative comparing value. Whether the comparing value is positive or negative may be determined in terms of the signal required by the electronic system 200. If a negative protection signal SD is desired, the protection apparatus 200 may include a phase-inverter electrically coupled to the comparator unit 204.

Figure 4:
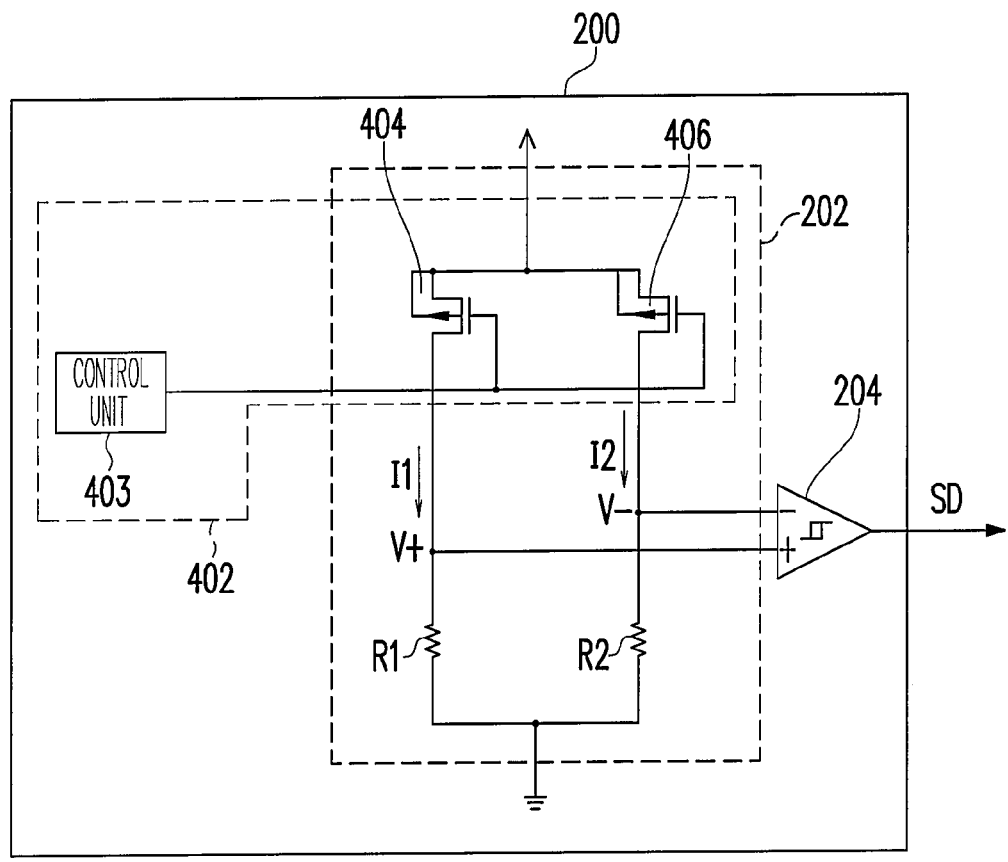
FIG. 4 is a circuit diagram of the protection apparatus of FIG. 2.

Referring to FIG. 4, the circuit diagram of the protection apparatus of FIG. 2 is illustrated. In the embodiment, the temperature detection module 202 includes a current mirror circuit 402, a first temperature detection element R1, and a second temperature detection element R2.

One end of the first temperature detection element R1 and one end of the second temperature detection element R2 are commonly grounded, and another end of the first second temperature detection element R1 and another end of the second temperature detection element R2 receive a first current signal I1 and a second current signal I2 generated by the current mirror circuit 402 to generate the first voltage signal V+ and the second voltage signal V− respectively. The first voltage signal V+ and the second voltage signal V− are sent to the comparator unit 204. In an exemplary process of fabricating the IC chip, the first temperature detection element R1 may be a positive temperature coefficient resistor, such as, for example, a resistor made of P+ material, and the second temperature detection element R2 may be a negative temperature coefficient resistor, such as, for example, a resistor made of HR POLY1 material. In addition, in this embodiment, when the ambient temperature does not reach the critical temperature T1, the resistance value of the second temperature detection element R2 is greater than that of the first temperature detection element R1.

In the present embodiment, the current mirror circuit 402 includes two PMOS transistors 404 and 406. The sources of the PMOS transistors 404 and 406 are commonly coupled to a voltage source, and the gates thereof are connected together and electrically coupled to a control unit 403 for applying a voltage to the gates of the PMOS transistor 404 and 406 so that the value of the first current signal I1 and the second current signal I2 are substantially the same. In addition, the drain of the PMOS transistor 404 is electrically coupled to one end of the first temperature detection element R1, and the drain of the PMOS transistor 406 is electrically coupled to one end of the second temperature detection element R2. Therefore, the electrical currents flowing through the first and second temperature detection elements R1 and R2 are the same.

Furthermore, the comparator unit 204 employs a hysteresis comparator, which generally has good noise-reduction function, thus minimizing the affects of errors during the fabrication of the first and second temperature detection elements R1 and R2.

Figure 5:
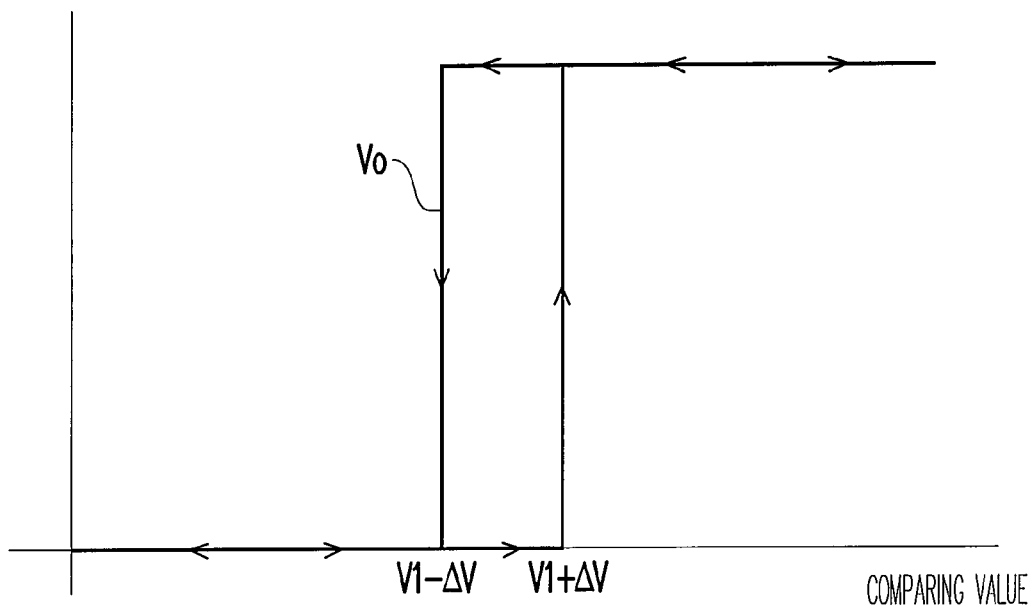
FIG. 5 is a view showing the operation principle of one kind of hysteresis comparator.

Referring to FIG. 5, an operation principle of one kind of hysteresis comparator is illustrated. If the difference between positive and negative input terminals of the hysteresis comparator is greater than a first predetermined voltage (for example, V1+ΔV), the output Vo of the hysteresis comparator is a positive voltage; on the contrary, if the difference between the positive and negative input terminals is smaller than a second predetermined voltage (for example, V1−ΔV), the output Vo is a negative voltage; and if the difference is not greater than the first predetermined voltage and not smaller than the second predetermined voltage, the output Vo maintains its previous state. Therefore, assuming the comparator unit 204 employs a hysteresis comparator, when the hysteresis comparator conducts a comparison between the first voltage signal V+ and the second voltage signal V−, the comparator generates the protection signal SD only when the difference there-between is greater than a predetermined voltage. The generation of the protection signal SD indicates that the ambient temperature may be too high, and a cutoff signal SD is generated as a result to cut off the operation of the electronic system. On the other hand, when the hysteresis comparator detects that the difference between the first voltage signal V+ and the second volgate signal V− is smaller than the predetermined voltage, it is determined that the ambient temperature is normal, and the electronic system is allowed to operate normally. The main reason for choosing the hysteresis comparator is for eliminating the external noise signal interferences. Therefore, the present invention can effectively decrease the affects caused by electric drifts which may be caused due to errors in fabrication of the electronic components.

In addition, signals noise entering into the protection apparatus system via the voltage source or grounding terminals may cause problems in the operation of the electronic system. To address this problem, in the protection apparatus 200 of this embodiment, the first temperature detection element R1 and the second temperature detection element R2 receive the noise signals at the same time, the noise signals can therefore be considered as a pair of common-mode noise signals which can be filtered by the comparator unit 204. Thus, the protection apparatus 200 has good noise-filtration function.

Figure 6:
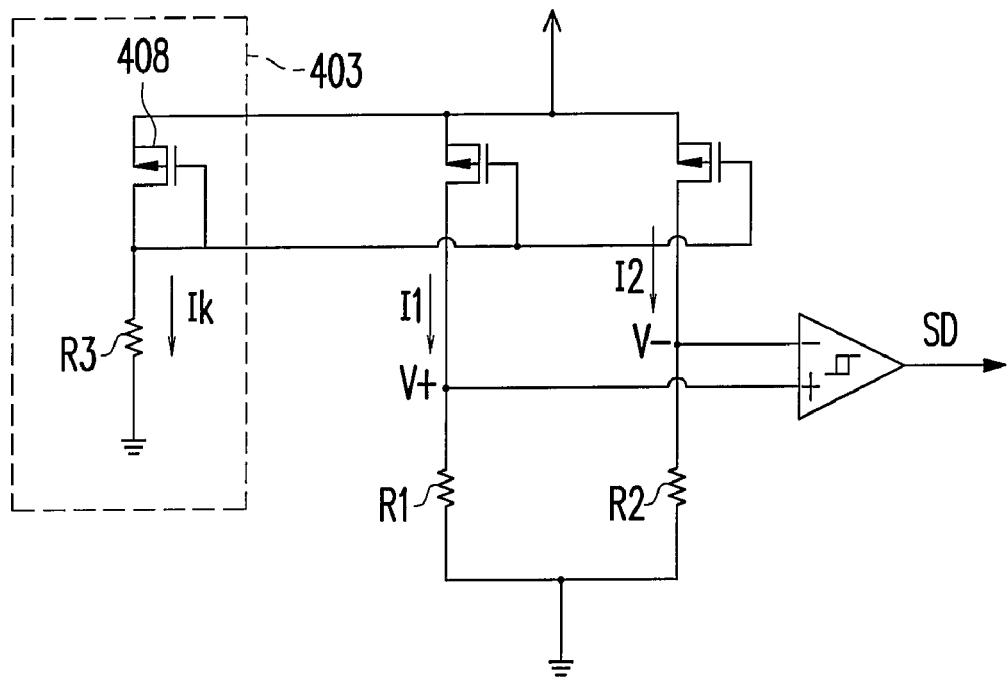
FIG. 6 is a circuit diagram of a protection apparatus of FIG. 2 in accordance with an another embodiment of the present invention.

Referring to FIG. 6, in another embodiment, the function of the control unit 403 may be realized by a PMOS transistor 408 and a resistor R3. The sources of the PMOS transistors 408, 404 and 406 are commonly coupled to the same voltage source, the gates of the PMOS transistors 408, 404 and 406 are electrically coupled together, the drain and the gate of the PMOS transistor 408 are coupled together, one end of the resistor R3 is electrically coupled to the drain of the PMOS transistor 408, and the other end of the resistor R3 is grounded. Since the PMOS transistors 404, 406 and 408 are arranged in a manner so as to form a current mirror circuit, the electrical currents Ik, I1 and I2, respectively flowing through the first temperature detection element R1, the second temperature detection element R2 and the resistor R3, are substantially the same.

Figure 7:
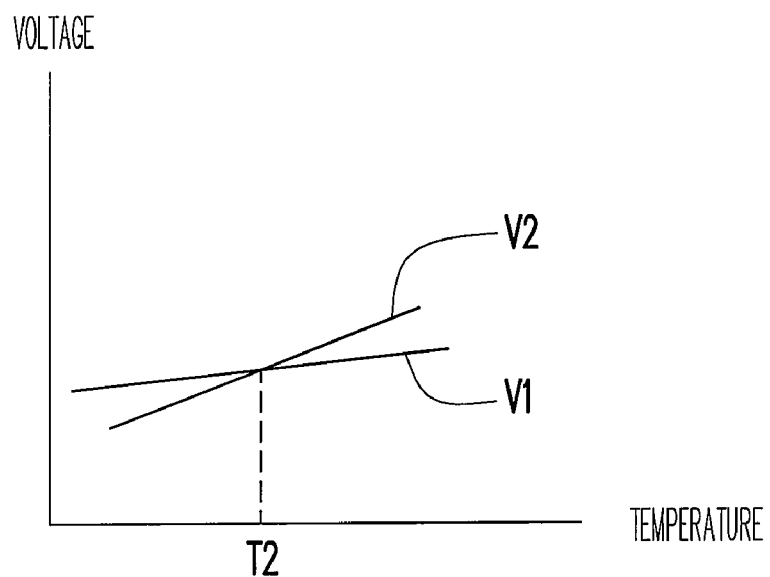
FIG. 7 is a view showing the variation of the first and second voltage signals with the ambient temperature change in accordance with an another embodiment of the present invention.

In addition, referring to FIG. 7, in another embodiment, the first temperature detection element R1 and the second temperature detection element R2 may alternatively be substituted by positive temperature detection elements with different temperature coefficients, or negative temperature detection elements with different temperature coefficients. It can be clearly seen in FIG. 7, the first voltage signal V1 and the second voltage signal V2 both have positive temperature characteristics but with different temperature coefficients. At temperature T2, the first and second voltage signals have the same value. Operation principle thereof is the same as that described above, which will not be repeated herein.

Figure 8:
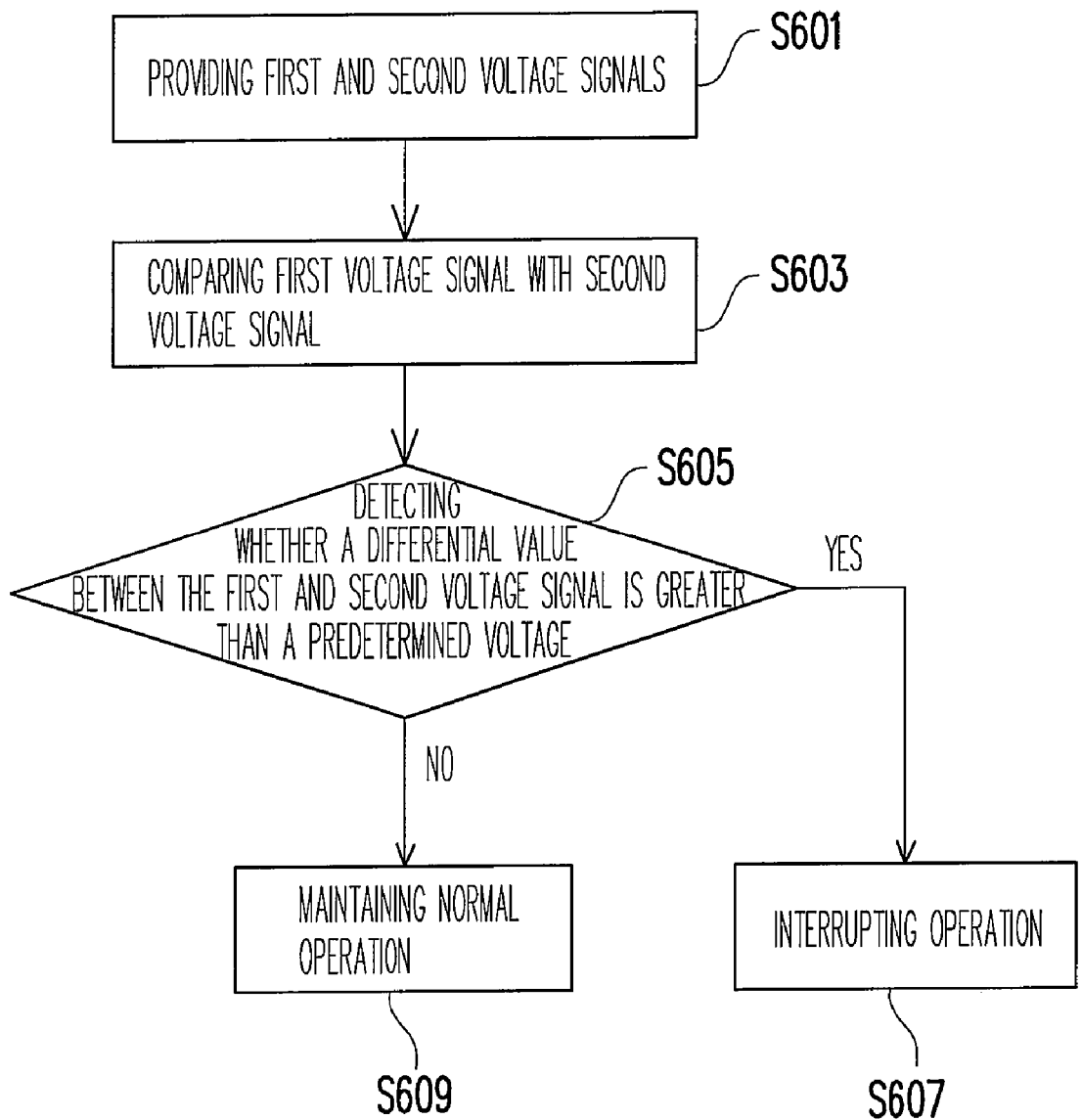
FIG. 8 is a flow chart of a protection method in accordance with a preferred embodiment of the present invention.

Referring to FIG. 8 which illustrates a thermal shutdown method in accordance with a preferred embodiment of the present invention, this method may be implemented by the above-described protection apparatus 200 to provide the thermal protection to the electronic system 220. The present thermal shutdown method includes the following steps. First, in Step S601, a first voltage signal V+ and a second voltage signal V− are provided, wherein the first voltage signal V+ and the second voltage signal V− may be generated by the temperature detection module 202, and the first voltage signal V+ has a positive temperature coefficient characteristics, while the second voltage signal V− has a negative temperature coefficient characteristics.

Next, in Step S603, a comparator unit 204 compares the first voltage signal V+ with the second voltage signal V−, wherein the value of the second voltage signal V− is subtracted from value of the first voltage signal V+.

Next, in Step S605, whether or not the difference between the first and second voltage signals V+ and V− is greater than a predetermined voltage is determined. If the difference is greater than the predetermined voltage, then the thermal shutdown method enters the Step S607, otherwise the method enters the Step S609.

wherein, in Step S607, the comparator unit 204 outputs a protection signal SD for ceasing the operation of the electronic system. In Step S609, the electronic system maintains normal operation.

Furthermore, the present invention also discloses a structure of a chip including a protection apparatus and a control apparatus, wherein the protection apparatus has the same elements as the above-described protection apparatus 200, and the detail description will not be repeated hereinafter. In this embodiment, when the ambient temperature is too high, the protection apparatus generates a protection signal and transmits to the control apparatus for controlling the chip to cease operation, thus providing thermal protection to the chip.

To sum up, the present invention has at least the following advantages:

1. By using the temperature detection elements to generate voltage signals with positive temperature coefficient and negative temperature coefficient, effective thermal protection may be provided to an electronic system.
2. Since the protection apparatus of the present invention employs a hysteresis comparator to realize the function of the comparator unit, noise due to errors in fabrication of the components may be effectively eliminated.
3. Since the present invention uses common mode input technology, and therefore the interference caused by noise signals may be effectively reduced. That is, the present invention has good noise-filtration function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A protection apparatus for providing thermal protection to an electronic system, comprising:
    a temperature detection module, configured for outputting a first voltage signal and a second voltage signal, wherein values of the first and second voltage signals vary with a variation of ambient temperature, the temperature detection module comprising:
        a current mirror circuit configured for generating a first current signal, and a second current signal having a value substantially same as that of the first current signal, the current mirror circuit comprising:
            a control unit, comprising:
                a third PMOS transistor, comprising a source coupled to the voltage source, a gate electrically coupled to the gate of the second PMOS transistor, and a drain and the gate of the third PMOS transistor are electrically connected together; and
                a resistor having one end thereof electrically coupled to the drain of the third PMOS transistor, and another end thereof grounded;
            a first PMOS transistor, comprising a source coupled to a voltage source, a gate electrically coupled to the control unit and a drain electrically coupled to one end of the positive temperature coefficient resistor, for outputting the first current signal to the positive temperature coefficient resistor; and
            a second PMOS transistor, comprising a source coupled to the voltage source, a gate electrically coupled to the gate of the first PMOS transistor and a drain electrically coupled to one end of the negative temperature coefficient resistor, for outputting the second current signal to the negative temperature coefficient resistor;
        a positive temperature coefficient resistor, wherein one end of the positive temperature coefficient resistor is grounded, and another end of the positive temperature coefficient resistor is configured for receiving the first current signal for generating the first voltage signal; and
        a negative temperature coefficient resistor, wherein one end of the negative temperature coefficient resistor is grounded, and another end of the negative temperature coefficient resistor is configured for receiving the second current signal for generating the second voltage signal; and
    a comparator unit, configured for comparing the first voltage signal with the second voltage signal to generate and transmit a protection signal to the electronic system to determine whether or not to allow the electronic system to operate normally.

2. The protection apparatus according to claim 1, wherein the first voltage signal is directly proportional to the ambient temperature, and the second voltage signal is inversely proportional to the ambient temperature.

3. The protection apparatus according to claim 1, wherein the material of the positive temperature coefficient resistor comprises P+, and the material of the negative temperature coefficient resistor comprises HR POLY1.

4. The protection apparatus according to claim 1, wherein a resistance value of the negative temperature coefficient resistor is greater than that of the positive temperature coefficient resistor when the ambient temperature does not reach a predetermined temperature.

5. The protection apparatus according to claim 1, wherein the comparator unit comprises a hysteresis comparator.

6. A method for providing a thermal protection to an electronic system, the method comprising:
    utilizing a control unit to generate a current source;
    providing a first current signal, and a second current signal having a value substantially same as that of the first current signal, wherein the first current signal and the second current signal are mirrored from the current source;
    providing a first voltage signal generated by the first current signal flowing through a positive temperature coefficient resistor, wherein the first voltage signal is directly proportional to ambient temperature;
    providing a second voltage signal generated by the second current signal flowing through a negative temperature coefficient resistor, wherein the second voltage signal is inversely proportional to ambient temperature;
    comparing the first voltage signal with the second voltage signal and generating a protection signal according to a comparison result; and
    determining whether to allow the electronic system to operate normally according to the protection signal.

7. The method according to claim 6, further comprising a step of generating the protection signal when the difference between the first and second voltage signals is greater than a predetermined voltage.

* * * * *